United States Patent
Kinkelaar et al.

(10) Patent No.: US 6,994,932 B2
(45) Date of Patent: Feb. 7, 2006

(54) LIQUID FUEL RESERVOIR FOR FUEL CELLS

(75) Inventors: Mark R. Kinkelaar, Eddystone, PA (US); Andrew Thompson, Eddystone, PA (US)

(73) Assignee: Foamex L.P., Linwood, PA (US)

( * ) Notice: Subject to any disclaimer, the term of this patent is extended or adjusted under 35 U.S.C. 154(b) by 398 days.

(21) Appl. No.: 10/183,943

(22) Filed: Jun. 28, 2002

(65) Prior Publication Data

US 2004/0001987 A1 Jan. 1, 2004

Related U.S. Application Data

(60) Provisional application No. 60/509,035, filed on Jun. 28, 2001.

(51) Int. Cl.
*H01M 2/00* (2006.01)

(52) U.S. Cl. .............................. 429/34; 429/12; 429/35
(58) Field of Classification Search ................... 429/12, 429/34, 35
See application file for complete search history.

(56) References Cited

U.S. PATENT DOCUMENTS

| | | | |
|---|---|---|---|
| 2,305,923 A | 12/1942 | Held | |
| 2,339,366 A | 1/1944 | Williams | |
| 2,997,282 A | 8/1961 | Binter et al. | |

(Continued)

FOREIGN PATENT DOCUMENTS

| | | |
|---|---|---|
| DE | 2831 799 C2 | 2/1979 |
| DE | 39 07 819 C2 | 9/1990 |
| EP | 0 100 530 A2 | 2/1984 |

(Continued)

OTHER PUBLICATIONS

Derwent Patent Abstract of DE 2831799.
Derwent Patent Abstract of DE 3907819.
Patent Abstracts of Japan of Publication No. 57–080673.
Korean Patents Abstracts of 000025190 A.
Patent Abstracts of Japan of Publication No. 59–066066.
Hallmark, J., "Miniature Fuel Cell Solutions for Portable Applications", Power 2000 Manufacturing Conference, San Diego, CA (Sep. 24–27, 2000), 9 pages.
Smotkin, E., "Direct Methanol Fuel Cell Catalysis", Knowledge Foundation's Small Fuel Cells and Battery Technologies for Portable Power Applications Conference Washington DC (Apr. 24, 2001), 11 pages.

(Continued)

*Primary Examiner*—Dah-Wei Yuan
(74) *Attorney, Agent, or Firm*—Drinkler Biddle & Reath LLP

(57) ABSTRACT

The present invention concerns a fuel reservoir for a liquid fuel cell particularly useful for portable electronic devices in which the fuel reservoir can deliver the liquid fuel regardless of the orientation. The fuel reservoir comprises (a) a container defining a cavity for holding the liquid fuel; (b) a wicking structure positioned within the cavity and into which at least a portion of the liquid fuel wicks and from which said liquid fuel subsequently may be discharged or delivered, such as by pumping or wicking. The wicking structure is formed from a wicking material with a free rise wick height greater than at least one half of the longest dimension of the wicking structure. Among materials with such wicking capability are foams, matted, bundled or woven fibers and nonwoven fibers. The container may have a generally flat and thin profile, formed as a pouch or envelope with substantially planar top and bottom faces of flexible film material, such that the container holding the wicking structure and filled with the liquid fuel can be bent or shaped.

108 Claims, 11 Drawing Sheets

U.S. PATENT DOCUMENTS

| | | | |
|---|---|---|---|
| 3,207,441 A | 9/1965 | Schreiber | |
| 3,334,789 A | 8/1967 | Kay et al. | |
| 3,396,923 A | 8/1968 | Windecker | |
| 3,428,222 A | 2/1969 | Wright | |
| 3,560,264 A | 2/1971 | Biddick | |
| 3,561,639 A | 2/1971 | Allen | 220/88 |
| 3,567,536 A | 3/1971 | Wickersham, Jr. | 156/78 |
| 3,615,845 A | 10/1971 | Gray | 136/86 |
| 3,650,431 A | 3/1972 | Stewart | 220/88 |
| 3,691,620 A | 9/1972 | Harr | 29/451 |
| 3,708,330 A | 1/1973 | Harr | 117/94 |
| 3,782,588 A | 1/1974 | Allen | 220/88 |
| 3,881,457 A | 5/1975 | Benner et al. | 123/136 |
| 3,896,964 A | 7/1975 | Takei et al. | 220/88 |
| 3,992,223 A | 11/1976 | Guthier | 429/14 |
| 4,007,058 A | 2/1977 | Nelson et al. | 429/34 |
| 4,035,551 A | 7/1977 | Grevstad | 429/44 |
| 4,175,165 A | 11/1979 | Adlhart | 429/30 |
| 4,179,027 A | 12/1979 | Weisberg | 206/205 |
| 4,294,279 A | 10/1981 | Wyeth | 137/264 |
| 4,303,755 A | 12/1981 | Yukuta et al. | 521/52 |
| 4,463,068 A | 7/1984 | Cohn et al. | 429/34 |
| 4,467,019 A | 8/1984 | Feigenbaum | 429/34 |
| 4,537,840 A | 8/1985 | Tsukui et al. | 429/33 |
| 4,615,455 A | 10/1986 | Tansill | 220/88 |
| 4,764,408 A | 8/1988 | Stedman et al. | 428/71 |
| 4,765,458 A | 8/1988 | Flanigen | 206/0.7 |
| 4,826,741 A | 5/1989 | Aldhart et al. | 429/19 |
| 4,855,194 A | 8/1989 | Wright | 429/38 |
| 4,876,162 A | 10/1989 | McElroy | 429/13 |
| 5,224,843 A | 7/1993 | Van Lintel | 417/413 |
| 5,288,159 A | 2/1994 | Wirt | 401/133 |
| 5,298,207 A | 3/1994 | Mifune et al. | 264/41 |
| 5,319,841 A | 6/1994 | Yata et al. | 29/451 |
| 5,358,799 A | 10/1994 | Gardner | |
| 5,374,711 A | 12/1994 | Toda et al. | 536/16.8 |
| 5,398,840 A | 3/1995 | Luhman et al. | 220/563 |
| 5,432,023 A | 7/1995 | Yamada et al. | 429/34 |
| 5,529,855 A | 6/1996 | Watanabe | 429/34 |
| 5,534,363 A | 7/1996 | Sprouse et al. | 429/34 |
| 5,544,785 A | 8/1996 | Frigiere | |
| 5,573,866 A | 11/1996 | Van Dine et al. | |
| 5,599,638 A | 2/1997 | Surampudi et al. | 429/33 |
| 5,697,990 A | 12/1997 | Shakley et al. | 48/174 |
| 5,759,712 A | 6/1998 | Hockaday | |
| 5,840,414 A | 11/1998 | Bett et al. | 428/307.7 |
| 6,020,089 A | 2/2000 | Harada et al. | 429/234 |
| 6,032,347 A | 3/2000 | Behr et al. | 29/419.1 |
| 6,054,228 A | 4/2000 | Cisar et al. | 429/18 |
| 6,117,592 A | 9/2000 | Hoshino et al. | 429/235 |
| 6,326,097 B1 * | 12/2001 | Hockaday | 429/34 |
| 6,334,674 B1 | 1/2002 | Ono et al. | 347/86 |
| 6,460,733 B2 | 10/2002 | Acker et al. | |
| 6,460,985 B1 * | 10/2002 | Olsen et al. | 347/86 |
| 6,506,513 B1 | 1/2003 | Yonetsu et al. | |
| 2001/0049045 A1 | 12/2001 | Hockaday et al. | 429/34 |
| 2001/0051293 A1 | 12/2001 | Narayanan et al. | 429/34 |
| 2003/0008193 A1 | 1/2003 | Kinkelaar et al. | |
| 2003/0142178 A1 | 7/2003 | McKinnell et al. | |
| 2003/0162070 A1 | 8/2003 | Hirsch et al. | |
| 2004/0001987 A1 | 1/2004 | Kinkelaar et al. | |

FOREIGN PATENT DOCUMENTS

| | | |
|---|---|---|
| EP | 0 107 396 B1 | 8/1988 |
| EP | 1 087 455 | 3/2001 |
| EP | 1 077 131 B1 | 7/2003 |
| JP | 57-080673 | 5/1982 |
| JP | 59-066066 | 4/1984 |
| JP | 6-275284 | 9/1994 |
| JP | 2001-102069 | 4/2001 |
| JP | 2001-313046 | 11/2001 |
| KR | 2000-0025190 | 5/2000 |
| WO | WO 98/21774 | 5/1998 |
| WO | WO 01/39300 A2 | 5/2001 |
| WO | WO 01/39307 A2 | 5/2001 |
| WO | WO 01/45189 A1 | 6/2001 |
| WO | WO 01/59865 A1 | 8/2001 |
| WO | WO 01/97314 A1 | 12/2001 |

OTHER PUBLICATIONS

Halpert, G., "The Direct Methanol Fuel Cell Prospects for Commercialization", The Road to Methanol Fuel Cell Vehicles A National Forum, Washington DC (Feb. 4–5, 1999), 19 pages.

Hallmark, J., "Motorola's Small Fuel Cell Program", Fuel Cell Catalyst, vol. 1, No. 3 (Spring 2001), 4 pages.

Ashley, S., "Fuel Cells Start to Look Real" Automotive Engineering International (Mar. 2001) pp. 64–80 (Automotive Engineering International Online at www.sae.org/automag/features/fuelcells).

Thomas, S. and Zalbowitz, M., "Fuel Cells—Green Power", Los Alamos National Laboratory (1999) 36 pages.

* cited by examiner

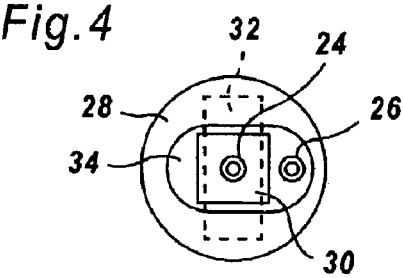
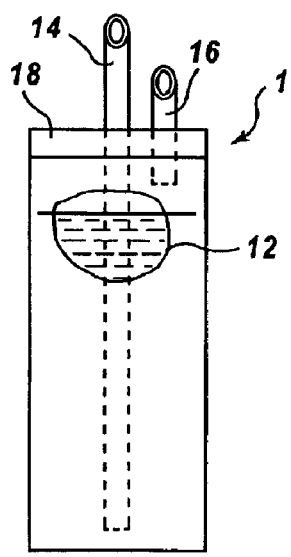
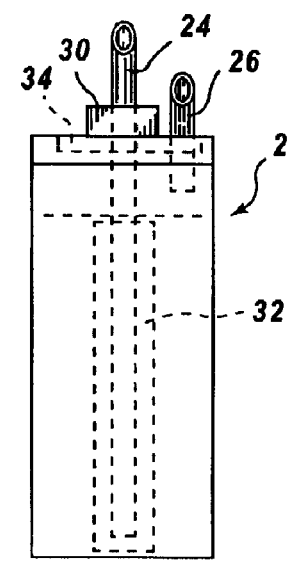
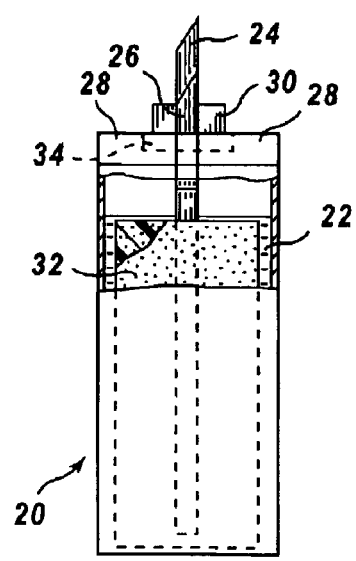
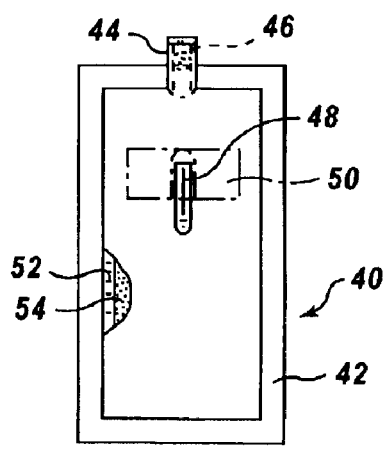
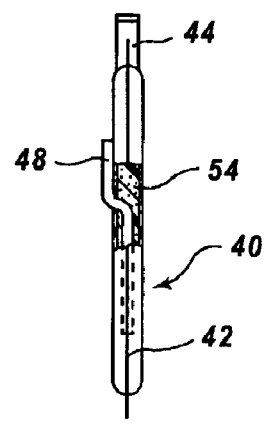

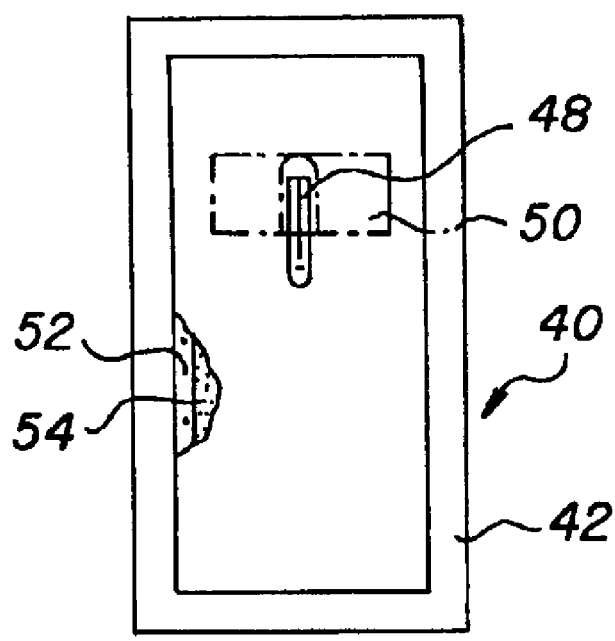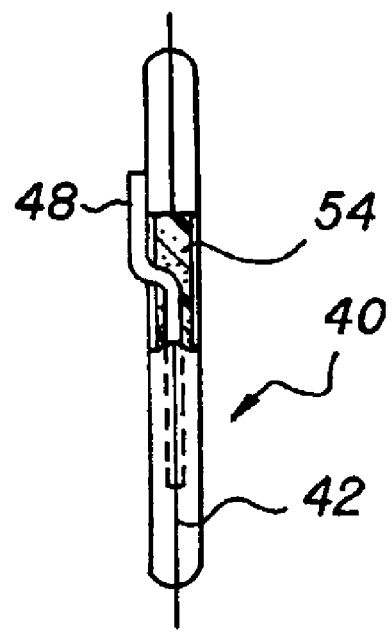

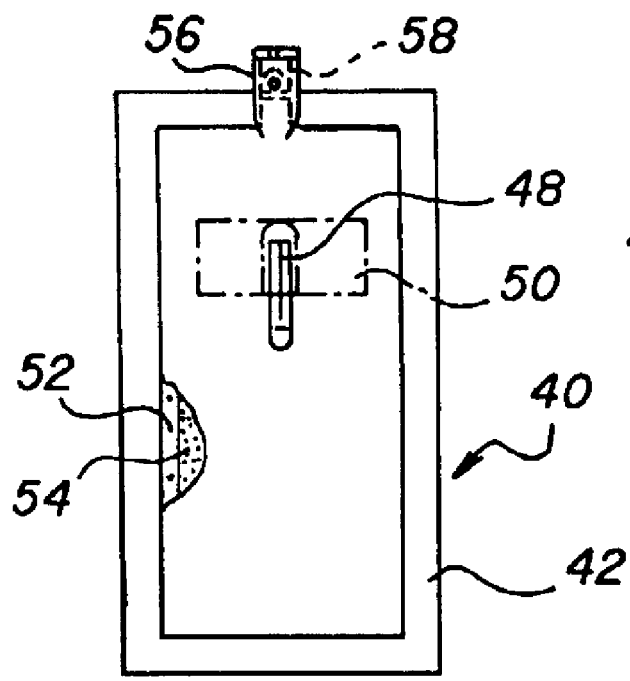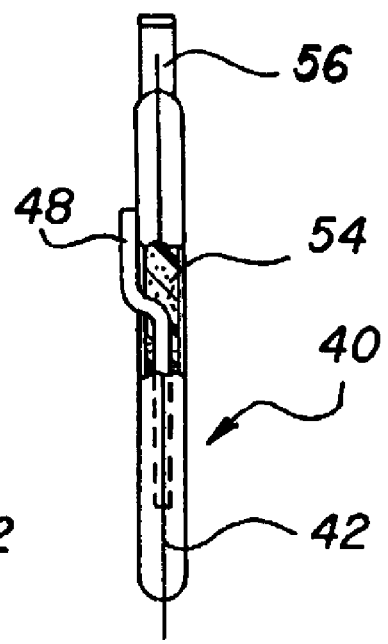

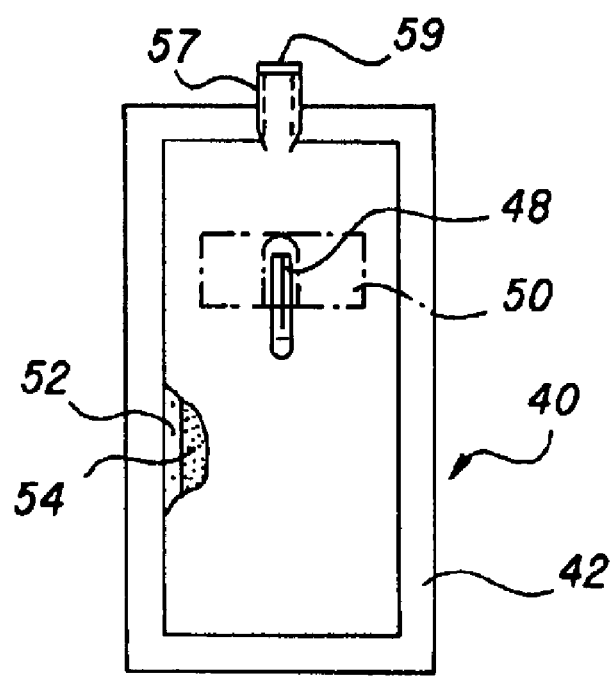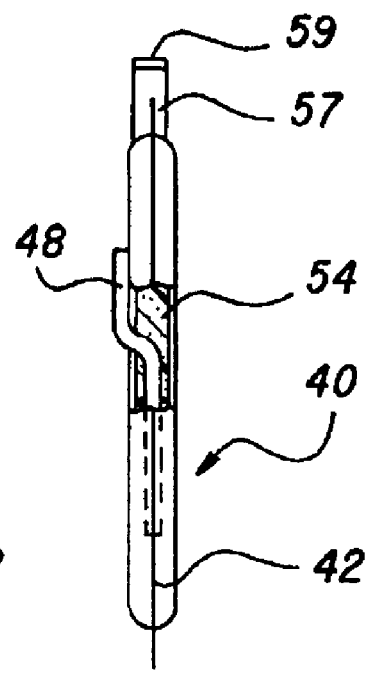

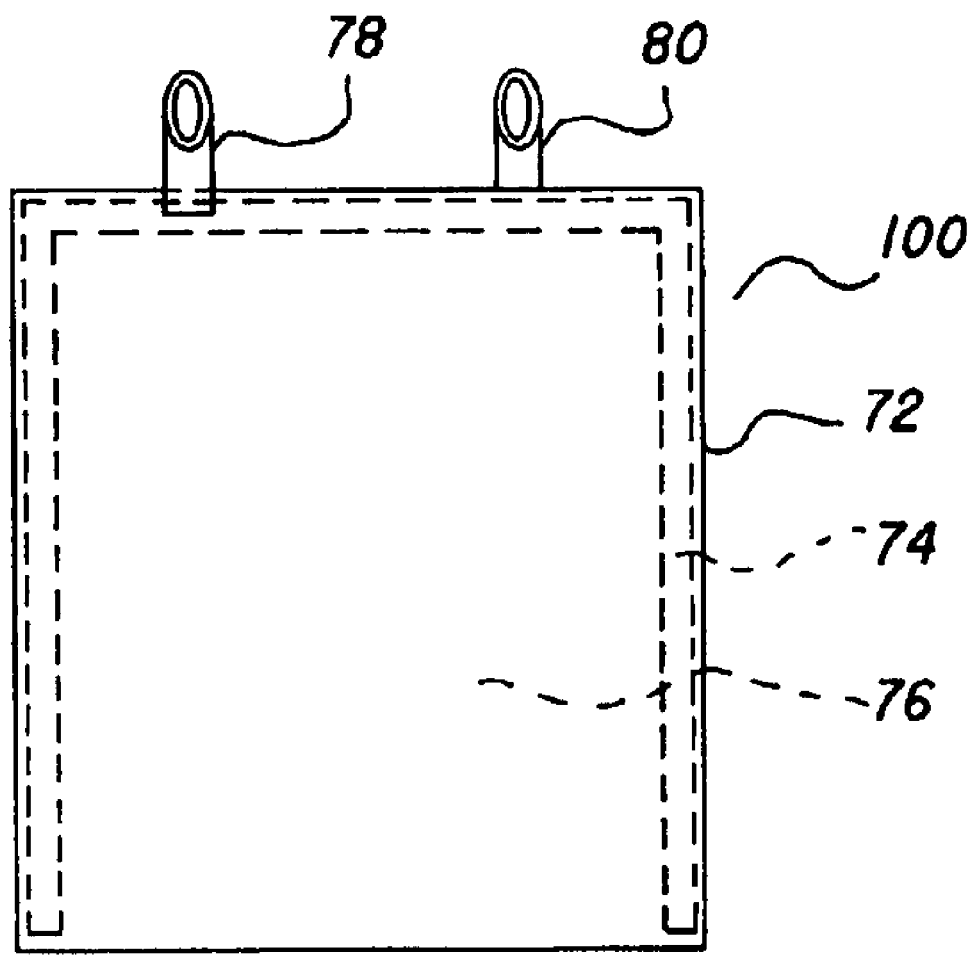

US 6,994,932 B2

LIQUID FUEL RESERVOIR FOR FUEL CELLS

This application claims the benefit of U.S. Provisional Patent Application No. 60/509,035, entitled "Liquid Fuel Delivery System for Fuel Cells", filed on Jun. 28, 2001 by the instant inventors, the disclosure of which is incorporated by reference.

This invention relates to liquid fuel cells in which the liquid fuel is indirectly or preferably directly oxidized at the anode. In particular, it relates to the reservoir for holding and metering or delivering the liquid fuel to the anode of a liquid fuel cell. This invention also relates to liquid fuel feed systems for micro fuel cell reformers.

BACKGROUND OF THE INVENTION

Electrochemical fuel cells convert reactants, namely fuel and oxidants, to generate electric power and reaction products. Electrochemical fuel cells generally employ an electrolyte disposed between two electrodes (an anode and a cathode). An electrocatalyst is needed to induce the desired electrochemical reactions at the electrodes. Liquid feed solid polymer fuel cells operate in a temperature range of from about 0° C. to the boiling point of the fuel, i.e., for methanol about 65° C., and are particularly preferred for portable applications. Solid polymer fuel cells include a membrane electrode assembly ("MEA"), which comprises a solid polymer electrolyte or proton-exchange membrane, sometimes abbreviated "PEM", disposed between two electrode layers. Flow field plates for directing the reactants across one surface of each electrode are generally disposed on each side of the membrane electrode assembly.

A broad range of reactants have been contemplated for use in solid polymer fuel cells, and such reactants may be delivered in gaseous or liquid streams. The oxidant stream may be substantially pure oxygen gas, but preferably a dilute oxygen stream such as found in air, is used. The fuel stream may be substantially pure hydrogen gas, or a liquid organic fuel mixture. A fuel cell operating with a liquid fuel stream wherein the fuel is reacted electrochemically at the anode (directly oxidized) is known as a direct liquid feed fuel cell.

A direct methanol fuel cell ("DMFC") is one type of direct liquid feed fuel cell in which the fuel (liquid methanol) is directly oxidized at the anode. The following reactions occur:

Anode: $CH_3OH+H_2O\rightarrow 6H^++CO_2+6e^-$

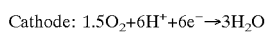
Cathode: $1.5O_2+6H^++6e^-\rightarrow 3H_2O$

The hydrogen ions (H+) pass through the membrane and combine with oxygen and electrons on the cathode side producing water. Electrons (e−) cannot pass through the membrane, and therefore flow from the anode to the cathode through an external circuit driving an electric load that consumes the power generated by the cell. The products of the reactions at the anode and cathode are carbon dioxide ($CO_2$) and water ($H_2O$), respectively. The open circuit voltage from a single cell is about 0.7 volts. Several direct methanol fuel cells are stacked in series to obtain greater voltage.

Other liquid fuels may be used in direct liquid fuel cells besides methanol—i.e., other simple alcohols, such as ethanol, or dimethoxymethane, trimethoxymethane and formic acid. Further, the oxidant may be provided in the form of an organic fluid having a high oxygen concentration—ie., a hydrogen peroxide solution.

A direct methanol fuel cell may be operated on aqueous methanol vapor, but most commonly a liquid feed of a diluted aqueous methanol fuel solution is used. It is important to maintain separation between the anode and the cathode to prevent fuel from directly contacting the cathode and oxidizing thereon (called "cross-over"). Cross-over results in a short circuit in the cell since the electrons resulting from the oxidation reaction do not follow the current path between the electrodes. To reduce the potential for cross-over of methanol fuel from the anode to the cathode side through the MEA, very dilute solutions of methanol (for example, about 5% methanol in water) are typically used as the fuel streams in liquid feed DMFCs.

The polymer electrolyte membrane (PEM) is a solid, organic polymer, usually polyperfluorosulfonic acid, that comprises the inner core of the membrane electrode assembly (MEA). Commercially available polyperfluorosulfonic acids for use as PEM are sold by E.I. DuPont de Nemours & Company under the trademark NAFION®. The PEM must be hydrated to function properly as a proton (hydrogen ion) exchange membrane and as an electrolyte.

For efficient function of the fuel cell, the liquid fuel should be controllably metered or delivered to the anode side. The problem is particularly acute for fuel cells intended to be used in portable applications, such as in consumer electronics and cell phones, where the fuel cell orientation with respect to gravitational forces will vary. Traditional fuel tanks with an outlet at the bottom of a reservoir, and which rely on gravity feed, will cease to deliver fuel when the tank orientation changes.

In addition, dipping tube delivery of a liquid fuel within a reservoir varies depending upon the orientation of the tube within the reservoir and the amount of fuel remaining in the reservoir. Referring to FIG. 1, a cartridge 10 holds a liquid fuel mixture 12 therein. An outlet tube 14 and an air inlet tube 16 protrude from the cartridge cover 18. If the cartridge 10 stably remained at this orientation, the fuel mixture could be drawn out from the outlet tube 14 by pumping action, and the volume space taken by the fuel exiting the cartridge 10 filled by air entering through the air inlet tube 16. However, if the cartridge 10 were tipped on its side, the fuel mixture could be drawn out only so long as the fuel level is above the fuel removal point of the outlet tube.

Accordingly, to facilitate use of liquid fuel cells in portable electronic devices, a liquid fuel reservoir that controllable holds and delivers fuel to a liquid fuel cell, regardless of orientation, is desired. A swappable, disposable, replaceable or recyclable liquid fuel reservoir is further desired. It is also desirable to maximize the amount of liquid fuel that the liquid fuel reservoir can hold.

SUMMARY OF THE INVENTION

According to one embodiment of the invention, a fuel reservoir for a liquid fuel cell comprises (a) a container having a wall and an interior defining a cavity for holding a liquid fuel for a liquid fuel cell;

(b) a wicking structure positioned within the cavity and into which at least a portion of the liquid fuel wicks and from which the liquid fuel may be metered, discharged or delivered; and (c) an outlet passageway through the container that communicates with the wicking structure in the cavity.

The fuel reservoir of the present invention controllably holds a liquid fuel for the liquid fuel cell. The fuel reservoir can deliver fuel to a liquid fuel cell regardless of orientation because the liquid fuel inside the container is in fluid communication with the outlet passageway without regard to the orientation of the fuel reservoir. The liquid fuel stored in the fuel reservoir can exit the container without being dependent on gravity.

Furthermore, the fuel reservoir of the present invention can be selectively attachable to or detachable from a fuel cell. The fuel reservoir can be swappable, disposable or replaceable. The fuel reservoir can also be recyclable or replenishable in that a spent fuel reservoir can be replenished with the liquid fuel via the outlet passageway or an optional liquid fuel inlet having a valve or a membrane, preferably made of fuel resistant rubber, through which the liquid fuel can be introduced into the spent fuel reservoir through a needle or the like to obtain a replenished fuel reservoir, wherein the membrane reseals the cavity after fuel introduction. In one of the embodiments of the recyclable or replenishable fuel reservoir of the present invention, the outlet passageway is fitted with a valve or sealable cap that allows the introduction of the liquid fuel into the spent fuel reservoir and prevents the liquid fuel from leaking out of the replenished fuel reservoir during storage or shipment before the next use. In another embodiment of the recyclable or replenishable fuel reservoir, the fuel reservoir further comprises a liquid fuel inlet fitted with a valve or sealable cap that allows the introduction of the liquid fuel into the spent fuel reservoir and prevents the liquid fuel from leaking out of the replenished fuel reservoir.

The wicking structure not only wicks and retains liquids, but permits liquids to be controllably metered or delivered out from such structure. The wicking structure has a geometry having a longest dimension. For a cylindrically shaped wicking structure, the longest dimension may be either its height or its diameter, depending upon the relative dimensions of the cylinder. For a rectangular box-shaped wicking structure, the longest dimension may be either its height or its length or its thickness, depending upon the relative dimensions of the box. For other shapes, such as a square box-shaped reservoir, the longest dimension may be the same in multiple directions. The free rise wick height (a measure of capillarity) of the wicking structure preferably is greater than at least one half of the longest dimension. Most preferably, the free rise wick height is greater than the longest dimension.

The wicking structure may be made from foams, bundled fibers, matted fibers, woven or nonwoven fibers, or inorganic porous materials. The wicking structure can in general be a porous member made of one or more polymers resistant to the liquid fuel. Preferably, the wicking structure is constructed from a wicking material selected from polyurethane foams (preferably felted polyurethane foams, reticulated polyurethane foams or felted reticulated polyurethane foams), melamine foams, and nonwoven felts or bundles of a polyamide such as nylon, polypropylene, polyester such as polyethylene terephthalate, cellulose, polyethylene, polyacrylonitrile, and mixtures thereof. Alternatively, the wicking structure is preferably constructed from a wicking material selected from polyurethane foams (preferably felted polyurethane foams, reticulated polyurethane foams or felted reticulated polyurethane foams), melamine foams, cellulose foams, nonwoven felts of a polyamide such as nylon, polyethylene, polypropylene, polyester, polyacrylonitrile, or mixtures thereof, bundled, matted or woven fibers of cellulose, polyester such as polyethylene terephthalate, polyethylene, polypropylene, polyacrylonitrile, and mixtures thereof. Certain inorganic porous materials, such as sintered inorganic powders of silica or alumina, can also be used as the wicking material for the wicking structure.

If a polyurethane foam is selected for the wicking structure, such foam should have a density in the range of about 0.5 to about 45, preferably about 0.5 to about 25, pounds per cubic foot, and pore sizes in the range of about 10 to about 200 pores per linear inch, more preferably a density in the range of about 0.5 to about 15 pounds per cubic foot and pore sizes in the range of about 40 to about 200 pores per linear inch, most preferably a density in the range of 0.5 to 10 pounds per cubic foot and pore sizes in the range of 75 to 200 pores per linear inch.

If a felted polyurethane foam is selected for the wicking structure, such as a felted reticulated polyurethane foam, such felted foam should have a density in the range of about 2 to about 45 pounds per cubic foot and a compression ratio in the range of about 1.1 to about 30, preferably a density in the range of about 3 to about 15 pounds per cubic foot and compression ratio in the range of about 1.1 to about 20, most preferably a density in the range of 3 to 10 pounds per cubic foot and compression ratio in the range of 2.0 to 15.

A felted foam is produced by applying heat and pressure sufficient to compress the foam to a fraction of its original thickness. For a compression ratio of 30, the foam is compressed to $1/30$ of its original thickness. For a compression ratio of 2, the foam is compressed to $½$ of its original thickness.

A reticulated foam is produced by removing the cell windows from the cellular polymer structure, leaving a network of strands and thereby increasing the fluid permeability of the resulting reticulated foam. Foams may be reticulated by in situ, chemical or thermal methods, all as known to those of skill in foam production.

The wicking material can be permanently or reversibly compressed to from the wicking structure. An example of a permanently compressed wicking material is a felted wicking material. An example of a reversibly compressed wicking structure is a wicking structure formed by compressing a wicking material while the wicking material is being put into the cavity of a container, so that structures such as the walls of the container help keep the wicking material in a compressed state while the wicking material is inside the container.

In a particularly preferred embodiment, the wicking structure is made with a foam with a capillarity gradient, such that the flow of the liquid fuel is directed from one region of the structure to another region of the structure as a result of the differential in capillarity between the two regions. One method for producing a foam with a capillarity gradient is to felt the foam to varying degrees of compression along its length. The direction of capillarity flow of liquid is from a lesser compressed region to a greater compressed region. Alternatively, the wicking structure may be made of a composite of individual components of foams or other materials with distinctly different capillarities. The capillarity gradient is such that the capillarity is greatest at the portion of the wicking structure proximate the outlet passageway of the fuel reservoir, and the further distal a portion of the wicking structure is from the outlet passageway the lesser will be the capillarity. With such a capillarity gradient, the liquid fuel in the wicking structure is directed to flow from a point furthest away from the outlet passageway toward the outlet passageway, aiding in the delivery of the liquid fuel by the fuel reservoir.

In one of the embodiments, the wicking structure held within the container conforms in shape substantially to the cavity of the container.

It is desirable to minimize the volume effectively occupied by the wicking structure inside the container by minimizing the solid volume of the wicking structure in order to maximize the amount of liquid fuel held in the container. Alternatively, to maximize the amount of liquid fuel held in the container, it is desirable to minimize the wicking material volume. The "solid volume" of the wicking structure is the volume occupied by the solid material of the wicking structure. In other words, the "solid volume" is the external volume of the wicking structure minus its void volume. The "wicking material volume" or the "volume of the wicking structure" is the sum of the solid volume and the volume of wicking pores in the wicking material. The wicking material volume is preferably no more than about 50%, more preferably no more than about 25%, and most preferably no more than about 10%, of the volume of the cavity within the container. The void volume of the wicking material is preferably at least about 50%, more preferably about 65% to 98%, and most preferably about 70% to 85%, of the external volume of the wicking material.

In an embodiment which minimizes the solid volume occupied by the wicking structure, the wicking structure volume is minimized by providing a wicking structure that extends to the extreme parts of the cavity within the container with the central portion of the cavity substantially devoid of the wicking structure either by making the wicking structure with no or only a minimal amount of wicking material in the central portion of the wicking structure or by substantially perforating the central portion of the wicking structure. With the wicking structure occupying at least the extreme parts of the cavity, all the liquid fuel in the cavity maintains, regardless of orientation, fluid communication with the outlet passageway of the container at least via capillarity. By reducing the amount of the wicking material in the central portion of the wicking structure to a minimum, the wicking structure volume is minimized and, consequently, the amount of the liquid fuel that the fuel reservoir can hold can be maximized. For instance, if the cavity within the container is planar having a square or rectangular shape and eight corners, the wicking structure is disposed at least at or proximate the eight extreme corners of the cavity. If the cavity is planar with the square or rectangular shape, the wicking structure can have a configuration of a square or rectangular sheet with a plurality of perforations, a square or rectangular rim, or a configuration shaped like the alphabet letters "E", "H", "K", "M", "N", "X" or "Z". On the other hand, if the cavity within the container is planar having a round or oval shape, the wicking structure is disposed at least as a circular or oval ring along the curved edge of the cavity.

The container of the fuel reservoir may take various shapes, such as a generally cylindrical cartridge comparable in size and shape to disposable dry cell batteries, or other known battery cartridge shapes. Alternatively, and particularly preferred, the container may form a generally planar thin pouch, packet or envelope having flexible top and bottom faces. The envelope may be formed from one or more sheets of a flexible plastic film or a plastic-coated film that are heat-sealed or ultra-sonic welded together at the side edges of the sheets. Such an envelope container is flexibly bendable when filled with liquid fuel, and the wicking structure into which at least a portion of the liquid fuel has wicked retains such liquid and permits metering or delivering of such liquid when the container is so bent. A removable tape may be supplied to cover the outlet passageway when the envelope container is shipped or stored prior to use.

A liquid delivery means, such as a pump or a wick, can communicate with the outlet passageway of the fuel reservoir to deliver the liquid fuel out of the container through the outlet passageway. Alternatively, the liquid fuel can flow out of the container via the outlet passageway under the force of gravity. The liquid fuel leaving the container can be delivered to an anode of a liquid fuel cell by gravity or preferably by the action of the liquid delivery means. In one of the embodiments, for instance, the liquid fuel can be delivered to the anode using a wick having differential capillarity with the capillarity in the wick greater in the part proximate the anode than the part proximate the outlet passageway. The liquid fuel can optionally be delivered to the anode by a series of wicks connected together having different capillarities to generate a capillarity gradient in order to direct the flow of the liquid fuel from the outlet passageway to the anode. If the container is made of a rigid material, an air inlet having a one-way valve is provided to the container to permit gas flow into the volume of the container as the liquid fuel exits the container through the outlet passageway. If the container is made of a flexible material, e.g. if the container is a flexible pouch, an air inlet is optional.

A further embodiment of the invention is a wicking material for a fuel reservoir for a liquid fuel cell formed from a wicking structure of foam, bundled fibers or nonwoven fibers. Preferably, the wicking structure is constructed from a wicking material selected from polyurethane foams (preferably felted polyurethane foams, reticulated polyurethane foams or felted reticulated polyurethane foams), melamine foam, and nonwoven felts or bundles of polyamide such as nylon, polypropylene, polyester such as polyethylene terephthalate, cellulose, polyethylene, polyacrylonitrile, and mixtures thereof. The wicking structure made from such wicking material not only wicks and retains liquids, but permits liquids to be controllably metered or delivered out from such structure. The free rise wick height (a measure of capillarity) of the wicking structure preferably is greater than at least one half of the longest dimension. Most preferably, the free rise wick height is greater than the longest dimension.

In a particularly preferred embodiment, the wicking material has a capillarity gradient, such that the flow of the liquid fuel is directed from one region of the material to another region of the material as a result of the differential in capillarity between the two regions. Alternatively, the wicking material may be formed as a composite of individual structures of the same or different materials with distinctly different capillarities.

If a polyurethane foam is selected for the wicking material, such foam should have a density in the range of 0.5 to 25 pounds per cubic foot, and pore sizes in the range of 10 to 200 pores per linear inch, preferably a density in the range of 0.5 to 15 pounds per cubic foot and pore sizes in the range of 40 to 200 pores per linear inch, most preferably a density in the range of 0.5 to 10 pounds per cubic foot and pore sizes in the range of 75 to 200 pores per linear inch.

If a felted polyurethane foam is selected for the wicking material, such as a felted reticulated polyurethane foam, such foam should have a density in the range of 2 to 45 pounds per cubic foot and a compression ratio in the range of 1.1 to 30, preferably a density in the range of 3 to 15 pounds per cubic foot and compression ratio in the range of 1.1 to 20, most preferably a density in the range of 3 to 10 pounds per cubic foot and compression ratio in the range of 2.0 to 15.

The fuel reservoir of the present invention can hold a liquid fuel for an indirect or direct fuel cell. Examples of the liquid fuel that the fuel reservoir can hold for a direct fuel cell are methanol, ethanol, ethylene glycol, dimethoxymethane, trimethoxymethane, formic acid or hydrazine. The liquid fuel that the fuel reservoir can hold for indirect fuel cells or reformers includes liquid hydrocarbons, such as methanol, petroleum and diesel fuel. The fuel reservoir of the present invention preferably contains methanol as the liquid fuel. The methanol in the fuel reservoir is an aqueous mixture of methanol or, preferably, pure methanol. The methanol concentration of the aqueous mixture is preferably at least about 3%, preferably at least about 5%, more preferably at least about 25%, even more preferably at least about 50%, further even more preferably at least about 60%, and most preferably about 70% to about 99%, e.g. about 85%, 90%, 95% or 99%, with the methanol concentration percentage expressed on a weight-to-weight basis.

DESCRIPTION OF THE FIGURES

FIG. 1 is a front elevational view partially broken away of a prior art fuel cartridge for a liquid fuel cell;

FIG. 2 is a front elevational view of a liquid fuel reservoir for a fuel cell according to the invention;

FIG. 3 is a right side elevational view partially broken away of the liquid fuel reservoir of FIG. 2;

FIG. 4 is a top plan view of the liquid fuel reservoir of FIGS. 2 and 3;

FIG. 5 is a front elevational view of an alternative liquid fuel reservoir for a fuel cell according to the invention;

FIG. 6 is a right side elevational view partially broken away of the alternative liquid fuel reservoir of FIG. 5;

FIG. 7 is a front elevational view of an alternative liquid fuel reservoir having no air inlet for a fuel cell according to the invention;

FIG. 8 is a right side elevational view partially broken away of the alternative liquid fuel reservoir of FIG. 7;

FIG. 9 is a front elevational view of an alternative liquid fuel reservoir having a liquid fuel introduction inlet 56 containing a valve 58 for a fuel cell according to the invention;

FIG. 10 is a right side elevational view partially broken away of the alternative liquid fuel reservoir of FIG. 9;

FIG. 11 is a front elevational view of an alternative liquid fuel reservoir having a liquid fuel introduction inlet 57 sealed by a membrane 59 made preferably of rubber for a fuel cell according to the invention;

FIG. 12 is a right side elevational view partially broken away of the alternative liquid fuel reservoir of FIG. 11;

FIG. 13 is a schematic diagram of a liquid fuel reservoir viewed from the front with the volume of the wicking structure minimized according to the invention;

DESCRIPTION OF THE PREFERRED EMBODIMENTS

Figure 14:
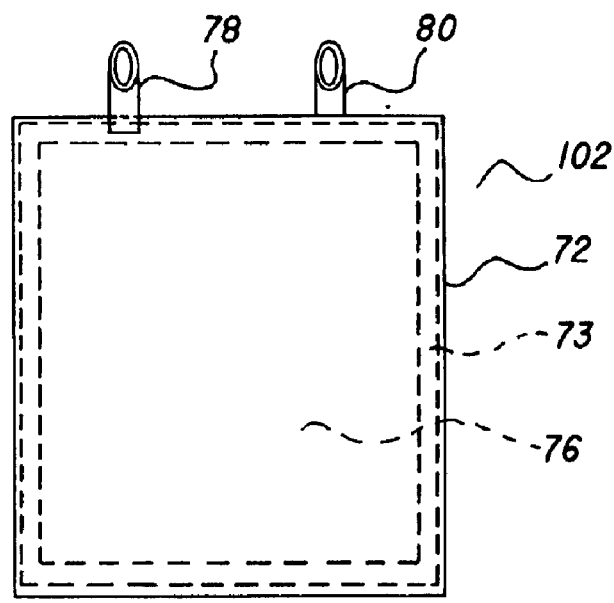
FIG. 14 is a schematic diagram of a liquid fuel reservoir viewed from the front with the volume of the wicking structure minimized according to the invention.
Figure 15:
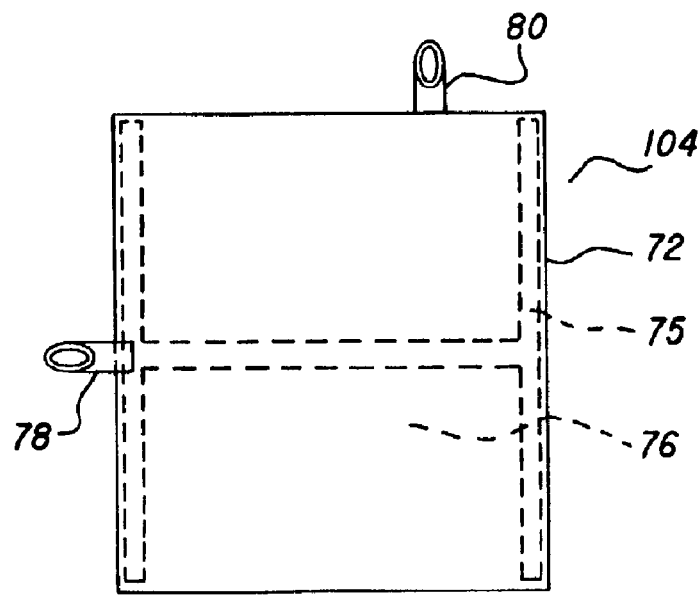
FIG. 15 is a schematic diagram of a liquid fuel reservoir viewed from the front with the volume of the wicking structure minimized according to the invention.
Figure 16:
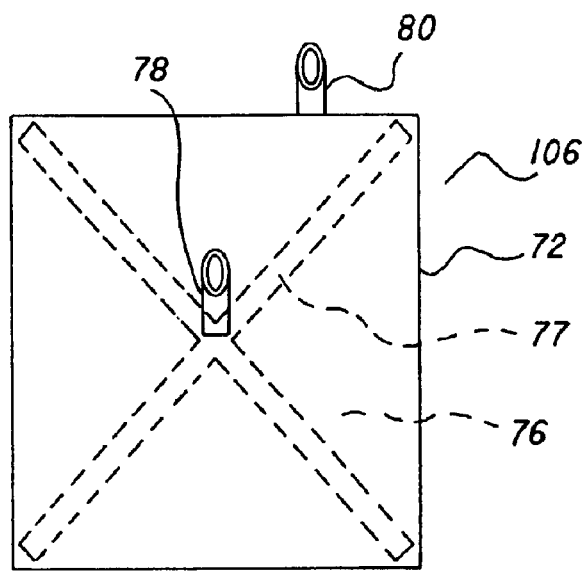
FIG. 16 is a schematic diagram of a liquid fuel reservoir viewed from the front with the volume of the wicking structure minimized according to the invention.
Figure 17:
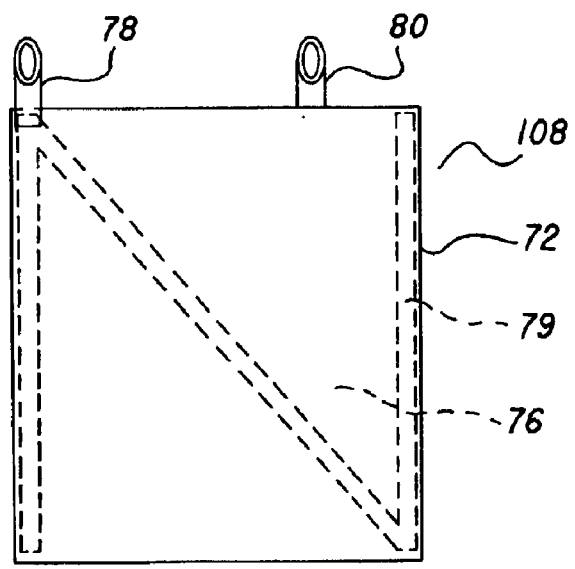
FIG. 17 is a schematic diagram of a liquid fuel reservoir viewed from the front with the volume of the wicking structure minimized according to the invention.
Figure 18:
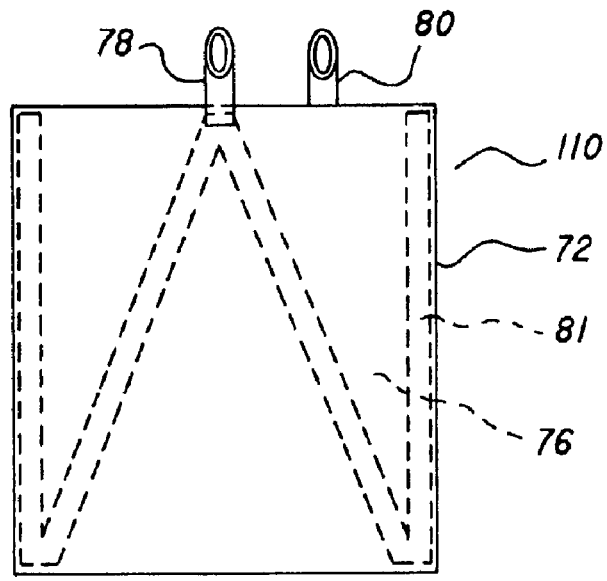
FIG. 18 is a schematic diagram of a liquid fuel reservoir viewed from the front with the volume of the wicking structure minimized according to the invention.
Figure 19:
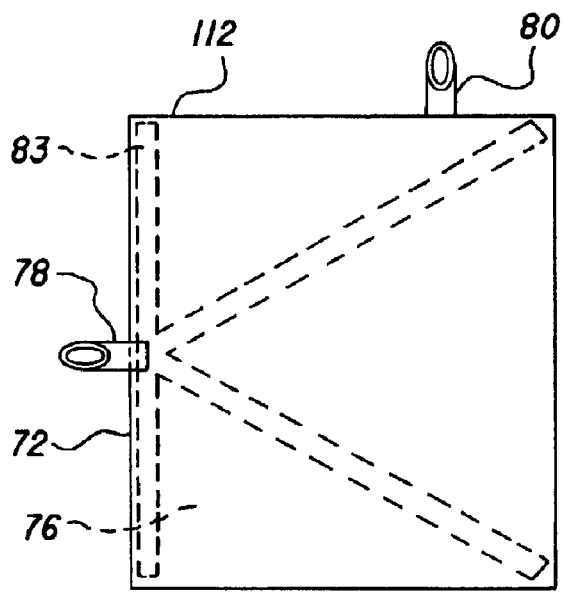
FIG. 19 is a schematic diagram of a liquid fuel reservoir viewed from the front with the volume of the wicking structure minimized according to the invention.
Figure 20:
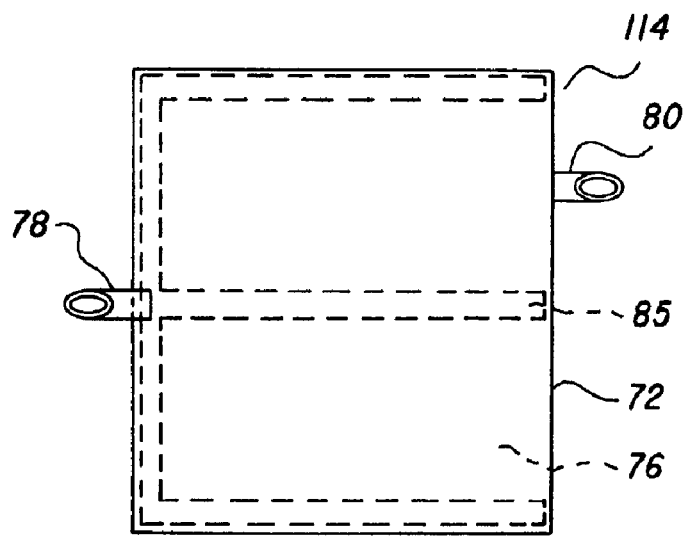
FIG. 20 is a schematic diagram of a liquid fuel reservoir viewed from the front with the volume of the wicking structure minimized according to the invention.

Referring first to FIGS. 2 to 4, a cartridge container 20 defines a cavity holding a liquid fuel mixture 22. An outlet tube 24 extends into the container 20 through a cover 28 and the outlet tube 24 communicates between the cavity of the container 20 and outside of the container. An air inlet tube 26 also extends into the container 20 through cover 28. The air inlet tube 26 may include a one way valve (not shown) so as to prevent liquid from flowing from the container 20.

A wicking structure 32 is provided within the cavity of the container 20. The wicking structure 32 surrounds the open end of the outlet tube 24 within the cavity of the container 20. Liquid fuel wicks into the wicking structure 32.

In the embodiment shown in FIGS. 2 to 4, the wicking structure is a felted polyurethane foam shaped as a rectangular cube or box. For example, the structure is approximately 10 mm (width)×5 mm (thickness)×90 (height) mm, with the 90 mm height as the longest dimension of the structure.

| The foam was produced with the following mix: | |
| --- | --- |
| Arcol 3020 polyol (from Bayer Corp.) | 100 parts |
| Water | 4.7 |
| Dabco NEM (available from Air Products) | 1.0 |
| A-1 (available for OSi Specialties/Crompton) | 0.1 |
| Dabco T-9 (available from Air Products) | 0.17 |
| L-620 (available from OSi Specialties/Crompton) | 1.3 |

After mixing for 60 seconds and allowed to degas for 30 seconds, 60 parts of toluene diisocyanate were added. This mixture was mixed for 10 seconds and then placed in a 15"×15"×5" box to rise and cure for 24 hours. The resulting foam had a density of 1.4 pounds per cubic foot and a pore size of 85 pores per linear inch. The foam was felted by applying heat (360° F.) and pressure sufficient to compress the foam to ⅕ of its original thickness (i.e., compression ratio=5). The heat and compressive pressure were applied for about 30 minutes. The felted foam had a density of 7.0 pounds per cubic foot.

The container 20 is filled with 6 ml. of an aqueous fuel solution containing 95% methanol. The cover 18 to the container comprises a cap with a rubber serum stopper 34.

A pump 30 acts on the outlet tube 24 and draws liquid fuel 22 from the wicking structure 32 through the outlet tube 24. Only a slight vacuum needs to be placed on the outlet tube 24 to draw the fuel mixture out of the container. Fuel may be drawn out regardless of the orientation of the container. In one test, with the container in its "vertical" orientation as shown in FIGS. 2 to 4, 5.0 ml of liquid fuel were drawn out of the fuel reservoir for a fixed pump setting. In a second test, with the container in an "upside-down" orientation (not shown), more than 2.0 ml of liquid fuel were drawn from the fuel reservoir at the same pump setting. While the "upside-down" orientation causes less efficient fuel delivery, fuel delivery was not interrupted, as would be the case for other fuel reservoirs.

In an alternate embodiment (not shown), the wicking structure was selected as a non-woven polyester fiber pad shaped into a rectangular cube or box of approximately 10 mm×5 mm×90 mm. The non-woven pad was formed by mixing together bulk fiber (polyester and melt-binder coated sheathed polyester) and forming the mixture with a combed roller into a layer. The layer was removed from the roller with a moving comb and transferred to a conveyor belt. The conveyor belt fed the material to an articulated arm that stacked multiple layers onto a separate conveyor belt. The multiple layers were heated and compressed to the desired final thickness. Similar fuel delivery was achieved with this non-woven polyester fiber wicking structure.

In a further alternate embodiment (not shown), the wicking structure comprised a needled felt. A blend of recycled polyester, polypropylene and nylon fibers were fiber-separated and a comb roller pulled a layer of fiber. The layer was removed from the roller with a moving comb and transferred to a conveyor belt. The conveyor belt fed the material to an articulated arm that stacked multiple layers onto a separate conveyor belt. The multiple layers (with a combined thickness of about 10 inches) were fed through two needling operations in which a bank of barbed needles compact the multiple layers together. Needling also forced some fibers to be pulled through the sample to entangle and hold the final shape of the needled felt together. Similar fuel delivery was achieved with a wicking structure formed as a rectangular cube of the needled felt.

Referring next to FIGS. 5 and 6, an alternate container of flexible packaging for a fuel reservoir is shown. The flexible fuel delivery pouch, packet or envelope 40 comprises one or more sheets connected together to form the pouch, packet or envelope with sealed edges 42. Preferably, the sheets are connected by heat-sealing or ultra-sonic welding. The envelope 40 defines a central volume forming a reservoir for a liquid fuel 52 for a fuel cell. An air inlet 44 is provided with a one way valve 46 to prevent liquid fuel from draining from the envelope 40. The air inlet 44 provides a passageway for air to enter the volume of the envelope as liquid fuel is drawn therefrom.

An outlet tube 48 is provided through the envelope 40. The outlet tube is in fluid communication between the interior volume of the envelope and the fuel cell. Prior to use, the outlet tube 48 may be covered with a covering tape 50, which is shown in phantom outline in FIG. 5. The tape covers the opening of the outlet tube 48. In this way, a pre-filled fuel reservoir may be shipped and stored without leakage of liquid fuel therefrom. The tape 50 is removed when the envelope is installed for use to fuel a fuel cell.

A wicking structure 54, formed from materials noted above with respect to the embodiment in FIGS. 2 to 4, is held within the volume of the envelope 40. Just as with the first embodiment, a pump (not shown in FIGS. 5 and 6) is used to draw liquid fuel from the interior volume of the container through the outlet tube 48. And like the first embodiment, efficient fuel delivery is independent of the orientation of the envelope and the wicking structure.

Preferably, the wicking structure 54 conforms in dimension to the interior volume of the envelope 40. Because the wicking structure 54 preferably is flexible, and the envelope 40 preferably is formed from flexible film materials, the entire fuel cell delivery system may be bent or flexed for various positions and configurations when in use. Moreover, the envelope 40 in this preferred embodiment is lightweight and formed with substantially planar top and bottom surfaces.

Referring to FIGS. 7 and 8, another flexible fuel reservoir is shown. The fuel reservoir according to FIGS. 7 and 8 is similar to the flexible fuel reservoir of FIGS. 5 and 6 except for the absence of the air inlet 44 and the one way valve 46 as the flexible pouch can collapse as fuel is withdrawn.

FIGS. 9 and 10 illustrate another flexible fuel reservoir of the present invention. The flexible fuel reservoir of FIGS. 9 and 10 is similar to the flexible fuel reservoir according to FIGS. 7 and 8 except for the presence of a liquid fuel inlet 56 having a valve 58 for the introduction of liquid fuel into the flexible pouch in order to replenish the flexible fuel reservoir with liquid fuel making the fuel reservoir recyclable.

FIGS. 11 and 12 illustrate another recyclable, flexible fuel reservoir of the present invention. The recyclable, flexible fuel reservoir of FIGS. 11 and 12 is similar to the flexible fuel reservoir according to FIGS. 9 and 10 except for the presence of a liquid fuel inlet 57 sealed with a membrane 59 preferably made of rubber for the introduction of fresh liquid fuel by a syringe or the like into the flexible pouch after some or all of the original liquid fuel has been discharged from the reservoir in order to replenish the spent fuel reservoir with liquid fuel making the fuel reservoir recyclable. Upon puncture, the membrane allows the introduction of the liquid fuel into the cavity, and after liquid fuel introduction the membrane reseals the cavity.

Referring to FIGS. 13 through 20, several embodiments of fuel reservoirs 100, 102, 104, 106, 108, 110, 112 and 114 with the volume of the wicking structures 73, 74, 75, 77, 79, 81, 83 and 85 minimized are shown. Each of the fuel reservoirs comprises a container 72 defining a cavity 76 having a wicking structure 73, 74, 75, 77, 79, 81, 83 or 85, a liquid fuel outlet passageway 78 and an optional air inlet 80 (depending on whether the container 72 is made of a rigid material). The wicking structures 73, 74, 75, 77, 79, 81, 83 and 85 of these fuel reservoirs occupy at least the extreme parts of the cavity 76. The wicking structure can have a 3-sided configuration (see FIG. 13), square or rectangular configuration (see FIG. 14) or a configuration in the shape of an alphabet letter "H", "X", "N", "M", "K" or "E" (see FIGS. 15–20, respectively).

Figure 21:
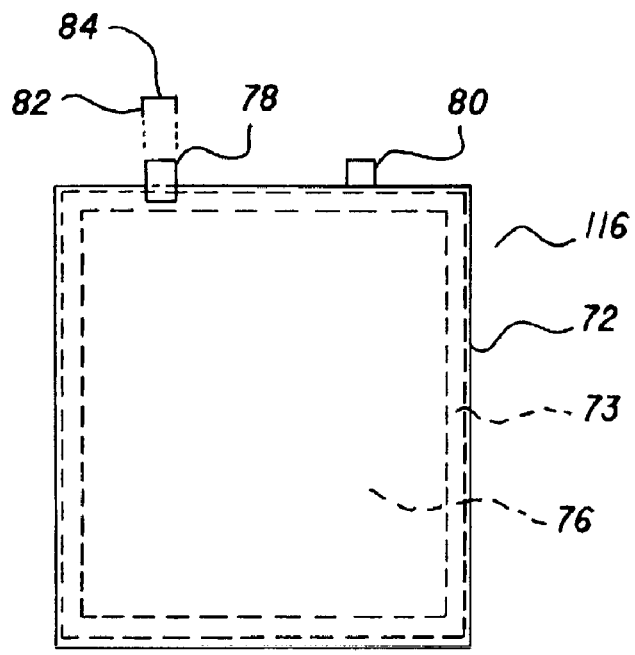
FIG. 21 is a schematic diagram of a recyclable or rechargeable liquid fuel reservoir with a liquid fuel outlet 78 having a sealable cap 82 containing a membrane 84 preferably made of rubber according to the invention.

FIG. 21 schematically shows an embodiment of a recyclable fuel reservoir according to the present invention. The recyclable fuel reservoir 116 comprises a container 72, wicking structure 73, cavity 76, an optional air inlet 80 and a liquid fuel outlet 78 having a sealable cap 82 and a membrane 84 preferably made of rubber on the sealable cap. After some or all of the original liquid fuel has been discharged from the fuel reservoir, the fuel reservoir can be disconnected from the fuel cell, the opening of the liquid fuel outlet 78 can then be sealed with the sealable cap 82 and fresh liquid fuel can be injected through the membrane 84 to replenish the spent fuel reservoir with liquid fuel.

Figure 22:
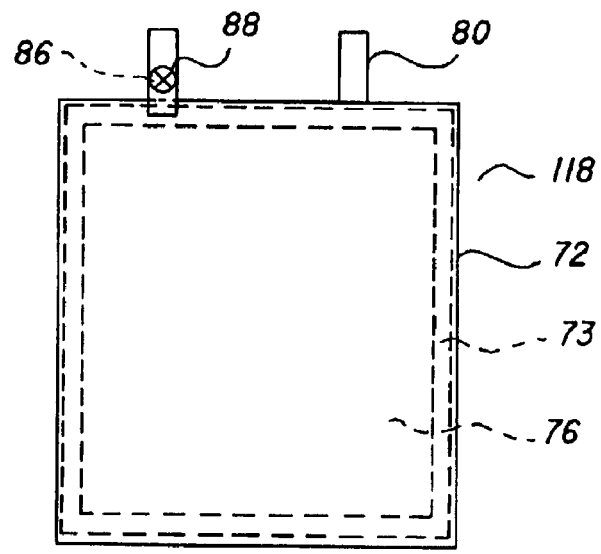
FIG. 22 is a schematic diagram of a recyclable or rechargeable liquid fuel reservoir having a valve 86 in a liquid fuel outlet 88 according to the invention.

FIG. 22 is a schematic view of another embodiment of a recyclable fuel reservoir according to the present invention. The recyclable fuel reservoir 118 comprises a container 72, wicking structure 73, cavity 76, an optional air inlet 80 and a liquid fuel outlet 88 having a valve 86. After some or all of the original liquid fuel has been discharged from the fuel reservoir, the valve 86 can be closed and the fuel reservoir is disconnected from the fuel cell. Fresh liquid fuel can be introduced into the spent fuel reservoir through the valve 86 to replenish the spent fuel reservoir with liquid fuel to make the fuel reservoir recyclable or rechargeable.

Figure 23:
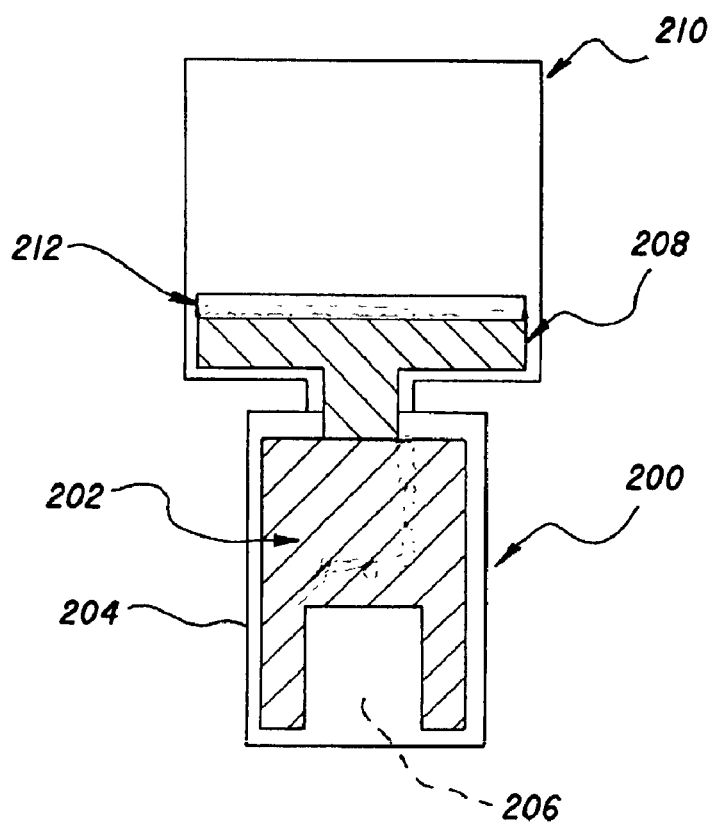
FIG. 23 is a schematic diagram of an arrangement of delivering liquid fuel from a fuel reservoir of the invention to the anode of a fuel cell by capillarity.

FIG. 23 schematically shows an embodiment in which a swappable fuel reservoir 200 of the present invention is connected to the anode 212 of a fuel cell 210 via a fuel delivery wick 208. The swappable fuel reservoir 200 comprises a container 204 defining a cavity 206, which contains a wicking structure 202, The wicking structure 202 of the fuel reservoir 200 is in contact with the fuel delivery wick 208. The capillary of the fuel delivery wick 208 is greater than the capillary of the wicking structure 202 so that a capillary gradient is created to deliver liquid fuel from the fuel reservoir 200 to the anode 212 of the fuel cell 210.

In a particularly preferred embodiment, the wicking structure is made with a foam with a capillarity gradient, such that the flow of the liquid fuel is directed from one region of the structure to another region of the structure as a result of the differential in capillarity between the two regions. One method for producing a material with a capillarity gradient is to felt a foam to varying degrees of compression along its length. Another method for producing a material with a capillarity gradient is to assemble a composite of individual components with distinctly different capillarities. The direction of capillarity flow of liquid is from a lower capillarity region to a higher capillarity region.

Figure 24:
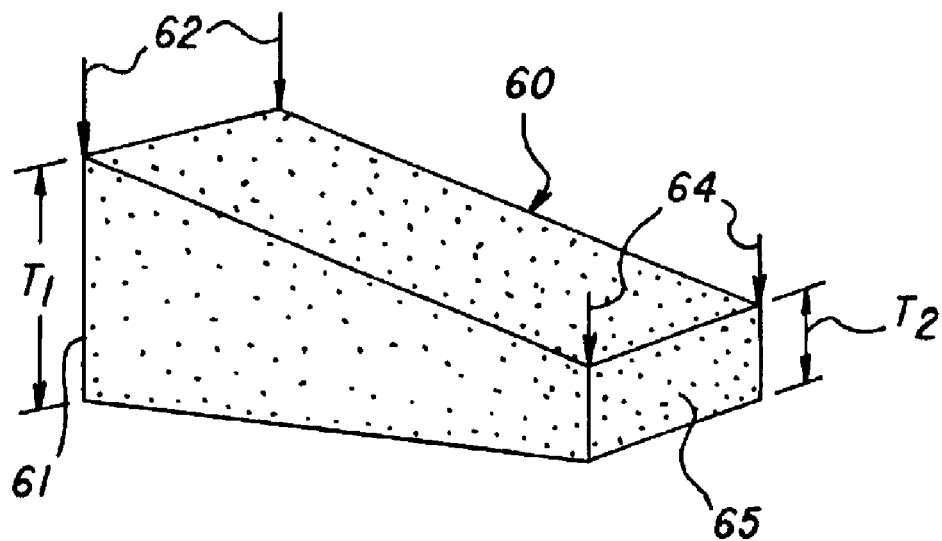
FIG. 24 is a schematic diagram of a wedge of wicking material prior to felting.
Figure 25:
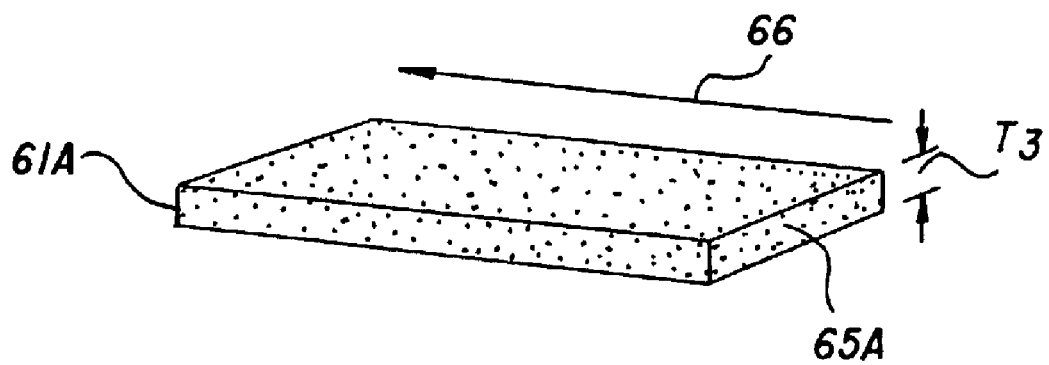
FIG. 25 is a schematic diagram of the wicking material of FIG. 24 after felting.

FIGS. 24 and 25 illustrate schematically a method for making a wicking material, such as foam, with a capillarity gradient. As shown in FIG. 24, a wedge-shaped slab 60 of foam of consistent density and pore size has a first thickness T1 at a first end 61 and a second thickness T2 at a second end 65. The slab 60 is subjected to a felting step—high temperature compression for a desired time to compress the slab 60 to a consistent thickness T3, which is less than the thicknesses T1 and T2. A greater compressive force, represented by arrows 62, is required to compress the material from T1 to T3 at the first end 61 than is the compressive force, represented by arrows 64 required to compress the material from T2 to T3 at the second end 65.

The compression ratio of the foam material varies along the length of the felted foam shown in FIG. 25, with the greatest compression at the first end 61A (T1 to T3) as compared with the second end 65A (T2 to T3). The capillary pressure is inversely proportional to the effective capillary radius, and the effective capillary radius decreases with increasing firmness or compression. Arrow 66 in FIG. 25 represents the direction of capillary flow from the region of lower felt firmness or capillarity to higher felt firmness or capillarity. Thus, if a wicking material or wicking structure is formed with a material or composite material having a capillarity gradient, the liquid fuel wicked into the material may be directed to flow from one region of the material with lower compression ratio to another region with higher compression ratio.

The invention has been illustrated by detailed description and examples of the preferred embodiments. Various changes in form and detail will be within the skill of persons skilled in the art. Therefore, the invention must be measured by the claims and not by the description of the examples or the preferred embodiments.

We claim:

1. A fuel reservoir for a liquid fuel cell, comprising:
   (a) a container having at least one wall and an interior defining a cavity holding a liquid fuel for the liquid fuel cell;
   (b) a wicking structure disposed within the cavity and into which at least a portion of the liquid fuel wicks and from which the liquid fuel may subsequently be delivered, wherein substantially all of the free liquid fuel in the container is contactable by the wicking structure, wherein the wicking structure has a longest dimension and the free rise wick height of the wicking structure is greater than at least one half of the longest dimension;
   (c) an outlet that provides fluid communication of the wicking structure through the at least one wall of the container to a location exterior of the container, wherein a portion of the outlet contains no wicking material, said portion going through the at least one wall of the container,
   (d) an inlet through the container, said inlet having a one-way valve to permit gas flow into the cavity of the container; and
   wherein the fuel reservoir is selectively detachable from or attachable to a liquid fuel cell.

2. The fuel reservoir of claim 1, wherein the free rise wick height of the wicking structure is greater than the longest dimension.

3. The fuel reservoir of claim 2, wherein the wicking structure comprises a wicking material selected from the group consisting of foams, bundled fibers, matted fibers, woven fibers, nonwoven fibers and inorganic porous materials.

4. The fuel reservoir of claim 1, wherein the wicking structure comprises a wicking material selected from the group consisting of foams, bundled fibers, matted fibers, woven fibers and nonwoven fibers.

5. The fuel reservoir of claim 4, wherein the wicking material is selected from the group consisting of:
   polyurethane foam;
   melamine foam;
   cellulose foam;
   nonwoven felts of polyamide, polyethylene, polypropylene, polyester, polyacrylonitrile, or mixtures thereof; and
   bundled, matted or woven fibers of cellulose, polyester, polyethylene, polypropylene and polyacrylonitrile, or mixtures thereof.

6. The fuel reservoir of claim 5, wherein the polyurethane foam is a felted polyurethane foam, reticulated polyurethane foam or felted reticulated polyurethane foam, the polyamide is nylon and the polyester is polyethylene terephthalate.

7. The fuel reservoir of claim 6, wherein the wicking material is selected from the group consisting of a felted polyurethane foam, reticulated polyurethane foam and felted reticulated polyurethane foam.

8. The fuel reservoir of claim 4, wherein the wicking structure comprises a polyurethane foam with a density in the range of about 0.5 to about 45 pounds per cubic foot and pore sizes in the range of about 10 to about 200 pores per linear inch.

9. The fuel reservoir of claim 8, wherein the wicking structure comprises a polyurethane foam with a density in the range of 0.5 to 15 pounds per cubic foot and pore sizes in the range of 40 to 200 pores per linear inch.

10. The fuel reservoir of claim 4, wherein the wicking structure is a felted reticulated polyurethane foam with a density in the range of 2 to 45 pounds per cubic foot and a compression ratio in the range of 1.1 to 30.

11. The fuel reservoir of claim 1, wherein the wicking structure has a capillarity gradient.

12. The fuel reservoir of claim 11, wherein the wicking structure comprises two or more components, wherein at least two of such components have different capillarities.

13. The fuel reservoir of claim 11, wherein the wicking structure comprises a foam felted to varying degrees of compression along a length of the foam.

14. The fuel reservoir of claim 11, wherein the capillarity is greatest at a portion of the wicking structure proximate the outlet, and a distal portion of the wicking structure is of lesser capillarity.

15. The fuel reservoir of claim 1, further comprising:
   a liquid delivery means in fluid communication with the outlet to deliver the liquid fuel out of the container through the outlet to the location exterior of the container.

16. A device comprising the fuel reservoir of claim 15 and an anode of a liquid fuel cell, wherein the liquid delivery means is in fluid communication with the anode.

17. The device of claim 16, wherein the liquid delivery means is a pump, said pump delivering the liquid fuel to the anode.

18. The fuel reservoir of claim 1, wherein the container has flexible sidewalls.

19. The fuel reservoir of claim 18, wherein the container comprises an envelope formed from one or more sheets of a plastic film or a plastic-coated film.

20. The fuel reservoir of claim 19, further comprising a removable tape that covers the outlet passageway when the container is shipped or stored prior to use.

21. The fuel reservoir of claim 19, wherein the container is flexibly bendable.

22. The fuel reservoir of claim 19, wherein the envelope has a first face and a second face and said first and second faces are substantially planar.

23. The fuel reservoir of claim 19, wherein the envelope is a pouch formed by heat-sealing or ultra-sonic welding.

24. A fuel reservoir for a liquid fuel cell, comprising:
   (a) a container having at least one wall and an interior defining a cavity holding a liquid fuel for the liquid fuel cell;
   (b) a wicking structure disposed within the cavity and into which at least a portion of the liquid fuel wicks and from which the liquid fuel may subsequently be delivered, wherein substantially all of the free liquid fuel in the container is contactable by the wicking structure, wherein the wicking structure has a longest dimension and the free rise wick height of the wicking structure is greater than at least one half of the longest dimension; and
   (c) an outlet that provides fluid communication of the wicking structure through the at least one wall of the container to a location exterior of the container, wherein a portion of the outlet contains no wicking material, said portion going through the at least one wall of the container,
      wherein the fuel reservoir is selectively detachable from or attachable to a liquid fuel cell;
      wherein the fuel reservoir is recyclable; and
      wherein the outlet has a valve that allows liquid fuel to be introduced into the cavity.

25. A fuel reservoir for a liquid fuel cell, comprising:
   (a) a container having at least one wall and an interior defining a cavity holding a liquid fuel for the liquid fuel cell;
   (b) a wicking structure disposed within the cavity and into which at least a portion of the liquid fuel wicks and from which the liquid fuel may subsequently be delivered, wherein substantially all of the free liquid fuel in the container is contactable by the wicking structure, wherein the wicking structure has a longest dimension and the free rise wick height of the wicking structure is greater than at least one half of the longest dimension; and
   (c) an outlet that provides fluid communication of the wicking structure through the at least one wall of the container to a location exterior of the container, wherein a portion of the outlet contains no wicking material, said portion going through the at least one wall of the container,
      wherein the fuel reservoir is selectively detachable from or attachable to a liquid fuel cell;
      wherein the fuel reservoir is recyclable; and
      wherein the outlet has a sealable cap that allows liquid fuel to be introduced into the cavity.

26. The fuel reservoir of claim 25, wherein the sealable cap has a membrane that upon puncture allows the introduction of the liquid fuel into the cavity, and after liquid fuel introduction the membrane reseals the cavity.

27. The fuel reservoir of claim 26, wherein the membrane comprises rubber.

28. The fuel reservoir of claim 12, wherein the wicking structure comprises first and second components, said first component having a higher capillarity than the second component, wherein said first component has a longest dimension, and the free rise wick height of the first component is greater than one half of the longest dimension of said first component.

29. The fuel reservoir of claim 28, wherein the free rise wick height of the first component is greater than the longest dimension of said first component.

30. The fuel reservoir of claim 1, wherein the wicking structure is made of a permanently compressed wicking material.

31. The fuel reservoir of claim 1, wherein the wicking structure is made of a reversibly compressed wicking material.

32. The fuel reservoir of claim 1, wherein the wicking structure has a wicking structure volume and the wicking structure volume is no more than about 50% of a volume of the cavity.

33. The fuel reservoir of claim 32, wherein the wicking structure volume is no more than about 25% of the volume of the cavity.

34. The fuel reservoir of claim 33, wherein the wicking structure volume is no more than about 10% of the volume of the cavity.

35. The fuel reservoir of claim 1, wherein the wicking structure has an external volume and void volume, which void volume is at least about 50% of the external volume of the wicking structure.

36. The fuel reservoir of claim 35, wherein the void volume of the wicking structure is about 65% to about 98% of the external volume of the wicking structure.

37. The fuel reservoir of claim 36, wherein the void volume of the wicking structure is about 70% to about 85% of the external volume of the wicking structure.

38. The fuel reservoir of claim 37, wherein the void volume of the wicking structure is about 75% of the external volume of the wicking structure.

39. The fuel reservoir of claim 37, wherein the void volume of the wicking structure is about 80% of the external volume of the wicking structure.

40. The fuel reservoir of claim 37, wherein the void volume of the wicking structure is about 85% of the external volume of the wicking structure.

41. The fuel reservoir of claim 1, wherein the liquid fuel comprises methanol.

42. The fuel reservoir of claim 1, wherein the liquid fuel is pure methanol.

43. The fuel reservoir of claim 1, wherein the liquid fuel is an aqueous mixture of methanol.

44. The fuel reservoir of claim 43, wherein the methanol concentration of the aqueous mixture is at least 25% by weight.

45. The fuel reservoir of claim 44, wherein the methanol concentration of the aqueous mixture is at least 50% by weight.

46. The fuel reservoir of claim 45, wherein the methanol concentration of the aqueous mixture is about 70% to 99% by weight.

47. The fuel reservoir of claim 46, wherein the methanol concentration of the aqueous mixture is about 90% by weight.

48. The fuel reservoir of claim 46, wherein the methanol concentration of the aqueous mixture is about 95% by weight.

49. The fuel reservoir of claim 46, wherein the methanol concentration of the aqueous mixture is about 99% by weight.

50. The fuel reservoir of claim 15, wherein the liquid delivery means is a pump.

51. The device of claim 16, wherein the liquid delivery means is a pump.

52. A fuel reservoir for a liquid fuel cell, comprising:
(a) a container having at least one wall and an interior defining a cavity holding a liquid fuel for the liquid fuel cell;
(b) a wicking structure disposed within the cavity and into which at least a portion of the liquid fuel wicks and from which the liquid fuel may subsequently be delivered, wherein substantially all of the free liquid fuel in the container is contactable by the wicking structure, wherein the wicking structure has a longest dimension and the free rise wick height of the wicking structure is greater than at least one half of the longest dimension;
(c) an outlet that provides fluid communication of the wicking structure through the at least one wall of the container to a location exterior of the container, wherein a portion of the outlet contains no wicking material, said portion going through the at least one wall of the container;
(d) an inlet through the container, said inlet having a one-way valve to permit gas flow into the cavity of the container; and
(e) a liquid delivery means interspersed between the outlet and the location exterior of the container, wherein the liquid delivery means delivers the liquid fuel from the outlet to the location exterior of the container.

53. A fuel reservoir for a liquid fuel cell, comprising:
(a) a container having at least one flexible wall and an interior defining a cavity holding a liquid fuel for the liquid fuel cell;
(b) a wicking structure disposed within the cavity and into which at least a portion of the liquid fuel wicks and from which the liquid fuel may subsequently be delivered, wherein substantially all of the free liquid fuel in the container is contactable by the wicking structure, wherein the wicking structure has a longest dimension and the free rise wick height of the wicking structure is greater than at least one half of the longest dimension; and
(c) an outlet that provides fluid communication of the wicking structure through the at least one flexible wall of the container to a location exterior of the container, wherein a portion of the outlet contains no wicking material, said portion going through the at least one flexible wall of the container, and
(d) an air inlet through the container, said air inlet having a one-way valve to permit gas flow into the cavity of the container.

54. A device, comprising:
(i) a recyclable fuel reservoir, wherein said recyclable fuel reservoir comprises;
(a) a container having at least one wall and an interior defining a cavity holding a liquid fuel for the liquid fuel cell;
(b) a wicking structure disposed within the cavity and into which at least a portion of the liquid fuel wicks and from which the liquid fuel may subsequently be delivered, wherein substantially all of the free liquid fuel in the container is contactable by the wicking structure, wherein the wicking structure has a longest dimension and the free rise wick height of the wicking structure is greater than at least one half of the longest dimension; and
(c) an outlet that provides fluid communication of the wicking structure through the at least one wall of the container to a location exterior of the container, said outlet having a valve or a sealable cap containing a membrane, wherein the membrane can be punctured by a needle for liquid fuel introduction and the membrane seals the cavity after the liquid fuel introduction, wherein a portion of the outlet contains no wicking material, said portion going through the at least one wall of the container;
(d) an air inlet through the container, said air inlet having a one-way valve to permit gas flow into the cavity of the container; and
(ii) a liquid fuel cell comprising an anode;
wherein the anode is in fluid communication with the outlet of the recyclable fuel reservoir.

55. The device of claim 16, wherein the wicking structure comprises a wicking material selected from the group consisting of foams, bundled fibers, matted fibers, woven fibers and nonwoven fibers.

56. The fuel reservoir of claim 1, wherein the wicking structure extends to extreme parts of the cavity so that substantially all of the free liquid fuel in the container is contactable by the wicking structure.

57. The fuel reservoir of claim 56, wherein at least some of the extreme parts of the cavity are internal corners of the cavity.

58. The fuel reservoir of claim 57, wherein at least some of the extreme parts of the cavity are some internal edges of the cavity.

59. The fuel reservoir of claim 1, wherein a central portion of the cavity is substantially devoid of the wicking structure.

60. The fuel reservoir of claim 56, wherein a central portion of the cavity is substantially devoid of the wicking structure.

61. The fuel reservoir of claim 57, wherein a central portion of the cavity is substantially devoid of the wicking structure.

62. The fuel reservoir of claim 58, wherein a central portion of the cavity is substantially devoid of the wicking structure.

63. The liquid fuel reservoir of claim 56, further comprising a liquid delivery means in fluid communication with the outlet to deliver the liquid fuel out of the container through the outlet to the location exterior of the container.

64. The liquid fuel reservoir of claim 57, further comprising a liquid delivery means in fluid communication with the outlet to deliver the liquid fuel out of the container through the outlet to the location exterior of the container.

65. The liquid fuel reservoir of claim 58, further comprising a liquid delivery means in fluid communication with the outlet to deliver the liquid fuel out of the container through the outlet to the location exterior of the container.

66. The liquid fuel reservoir of claim 59, further comprising a liquid delivery means in fluid communication with the outlet to deliver the liquid fuel out of the container through the outlet to the location exterior of the container.

67. The liquid fuel reservoir of claim 60, further comprising a liquid delivery means in fluid communication with the outlet to deliver the liquid fuel out of the container through the outlet to the location exterior of the container.

68. The liquid fuel reservoir of claim 61, further comprising a liquid delivery means in fluid communication with the outlet to deliver the liquid fuel out of the container through the outlet to the location exterior of the container.

69. The liquid fuel reservoir of claim 62, further comprising a liquid delivery means in fluid communication with the outlet to deliver the liquid fuel out of the container through the outlet to the location exterior of the container.

70. The liquid fuel reservoir of claim 63, wherein the liquid delivery means is a pump.

71. A device comprising the fuel reservoir of claim 63 and an anode of a liquid fuel cell, wherein the liquid delivery means is in fluid communication with the anode.

72. The device of claim 71, wherein the liquid delivery means is a pump.

73. The fuel reservoir of claim 1, wherein the container has multiple walls, all the walls being flexible.

74. The fuel reservoir of claim 52, wherein the container has multiple walls, all the walls being flexible.

75. The fuel reservoir of claim 53, wherein the container has multiple walls, all the walls being flexible.

76. The device of claim 54, wherein the container has multiple walls, all the walls being flexible.

77. The fuel reservoir of claim 56, wherein the container has first, second, third, fourth, fifth and sixth walls with the first wall opposite the second wall, the third wall opposite the fourth wall, and the fifth wall opposite the sixth wall, the outlet going through one of the first, second, third and fourth walls;
wherein the wicking structure has first, second, third and fourth members with the first member opposite the second member and the third member opposite the fourth member, each of the members having first and second ends, wherein the first end of the first member is connected to the first end of the third member, the second end of the first member is connected to the first end of the fourth member, the first end of the second member is connected to the second end of the third member and the second end of the second member is connected to the second end of the fourth member, and
wherein the first member is disposed proximate an inner surface of the first wall, the second member is disposed proximate an inner surface of the second wall, the third member is disposed proximate an inner surface of the third wall, and the fourth member is disposed proximate an inner surface of the fourth wall.

78. The fuel reservoir of claim 56;
wherein the container has six walls with a first wall opposite a second wall, a third wall opposite a fourth wall, and a fifth wall opposite a sixth wall, the outlet going through one of the first, third and fourth walls;
wherein the wicking structure comprises first, second and third elongate members with the first member disposed proximate an inner surface of the third wall, the second member disposed proximate an inner surface of the first wall, and the third member disposed proximate an inner surface of the fourth wall, each of the first, second and third elongate members comprising first and second ends with the second end of the first elongate member connected to the first end of the second elongate member and the second end of the second elongate member connected to the first end of the third elongate member; and
wherein the outlet goes through the first, third or fourth wall.

79. The fuel reservoir of claim 56, wherein the container comprises six walls with a first wall being opposite a second wall, a third wall being opposite a fourth wall and a fifth wall being opposite a sixth wall, each wall of the container being connected to the other walls of the container except the opposite wall, the outlet going through the first wall;
wherein the wicking structure comprises first, second, third and fourth substantially planar members with the first member being opposite the second member and the third member being opposite the fourth member, each of the members having first and second ends with the first end of the first member connected to the first end of the third member, the second end of the first member connected to the first end of the fourth member, the first end of the second member connected to the second end of the third member, and the second end of the second member connected to the second end of the fourth member;
wherein the first member is disposed proximate the inner surface of the first wall, the second member is disposed proximate the inner surface of the second wall, the third member is disposed proximate the inner surface of the third wall, and the fourth member is disposed proximate the inner surface of the fourth wall.

80. The fuel reservoir of claim 79, wherein the first member covers substantially the entire inner surface of the first wall, the second member covers substantially the entire inner surface of the second wall, the third member covers substantially the entire inner surface of the third wall, and the fourth member covers substantially the entire inner surface of the fourth wall.

81. The fuel reservoir of claim 56, wherein the container comprises six walls with a first wall being opposite a second wall, a third wall being opposite a fourth wall and a fifth wall being opposite a sixth wall, each wall of the container being connected to the other walls of the container except the opposite wall, the outlet going through the first wall;
wherein the wicking structure comprises first, second, third and fourth substantially rectangular members with the first member being opposite the second member and the third member being opposite the fourth member, each of the members having first and second ends with the first end of the first member connected to the first end of the third member, the second end of the first member connected to the first end of the fourth member, the first end of the second member connected to the second end of the third member, and the second end of the second member connected to the second end of the fourth member;
wherein the first member is disposed proximate the inner surface of the first wall, the second member is disposed proximate the inner surface of the second wall, the third member is disposed proximate the inner surface of the third wall, and the fourth member is disposed proximate the inner surface of the fourth wall.

82. The fuel reservoir of claim 81, wherein the first member covers substantially the entire inner surface of the first wall, the second member covers substantially the entire inner surface of the second wall, the third member covers substantially the entire inner surface of the third wall, and the fourth member covers substantially the entire inner surface of the fourth wall.

83. The fuel reservoir of claim 56, wherein the container comprises six walls with a first wall being opposite a second wall, a third wall being opposite a fourth wall and a fifth wall being opposite a sixth wall, each wall of the container being connected to the other walls of the container except the opposite wall, the outlet going through the first wall;

wherein the wicking structure comprises first, second, and third substantially planar members with the second member being opposite the third member, each of the members having two ends with one of the ends of the first member connected to one of the ends of the third member, and the other end of the first member connected to one of the ends of the second member;

wherein the first member is disposed proximate the inner surface of the first wall, the second member is disposed proximate the inner surface of the third wall, and the third member is disposed proximate the inner surface of the fourth wall.

84. The fuel reservoir of claim 83, wherein the first member covers substantially the entire inner surface of the first wall, the second member covers substantially the entire inner surface of the third wall, and the third member covers substantially the entire inner surface of the fourth wall.

85. The fuel reservoir of claim 56, wherein the container comprises six walls with a first wall being opposite a second wall, a third wall being opposite a fourth wall and a fifth wall being opposite a sixth wall, each wall of the container being connected to the other walls of the container except the opposite wall, the outlet going through the first wall;

wherein the wicking structure comprises first, second, and third substantially rectangular members with the second member being opposite the third member, each of the members having two ends with one of the ends of the first member connected to one of the ends of the third member, and the other end of the first member connected to one of the ends of the second member;

wherein the first member is disposed proximate the inner surface of the first wall, the second member is disposed proximate the inner surface of the third wall, and the third member is disposed proximate the inner surface of the fourth wall.

86. The fuel reservoir of claim 85, wherein the first member covers substantially the entire inner surface of the first wall, the second member covers substantially the entire inner surface of the third wall, and the third member covers substantially the entire inner surface of the fourth wall.

87. The fuel reservoir of claim 56, wherein the container comprises six walls with a first wall being opposite a second wall, a third wall being opposite a fourth wall and a fifth wall being opposite a sixth wall, each wall of the container being connected to the other walls of the container except the opposite wall, the outlet going through the first wall;

wherein the wicking structure comprises first and second opposite members and a connecting member, the first and second opposite members and the connecting member being substantially planar, each of the first and second opposite members and the connecting member having first and second ends with the first ends of the first and second opposite members disposed opposite to each other and the second ends of the first and second opposite members disposed opposite to each other;

wherein the first end of the connecting member is connected to the first end of the first opposite member and the second end of the connecting member is connected to the first end of the second opposite member forming the wicking structure in the shape of a substantially rectangular frame having first and second supports and a span, each of the supports and span having outer and inner surfaces with the inner surface closer to a center of the cavity of the container than the outer surface;

wherein the connecting member is disposed proximate the inner surface of the first wall, the first opposite member is disposed proximate the inner surface of the third wall, and the second opposite member is disposed proximate the inner surface of the fourth wall.

88. The fuel reservoir of claim 87, wherein the connecting member covers substantially the entire inner surface of the first wall, the first opposite member covers substantially the entire inner surface of the third wall, and the second opposite member covers substantially the entire inner surface of the fourth wall.

89. The fuel reservoir of claim 87, wherein each of the inner surfaces of the first, third and fourth walls comprises four edges and four corners, and wherein each of the outer surfaces of the first and second supports and the span of the wicking structure comprises four edges and four corners, with the four edges of the outer surface of the span disposed proximate the four edges of the inner surface of the first wall, the four corners of the outer surface of the span disposed proximate the four corners of the inner surface of the first wall, the four edges of the outer surface of the first support disposed proximate the four edges of the inner surface of the third wall, the four corners of the outer surface of the first support disposed proximate the four corners of the inner surface of the third wall, the four edges of the outer surface of the second support disposed proximate the four edges of the inner surface of the fourth wall, and the four corners of the outer surface of the second support disposed proximate the four corners of the inner surface of the fourth wall.

90. The fuel reservoir of claim 56, wherein the container comprises six walls with a first wall being opposite a second wall, a third wall being opposite a fourth wall and a fifth wall being opposite a sixth wall, each wall of the container being connected to the other walls of the container except the opposite wall, the outlet going through the first wall;

wherein the wicking structure comprises first and second opposite members and a connecting member, the first and second opposite members and the connecting member being substantially rectangular, each of the first and second opposite members and the connecting member having first and second ends with the first ends of the first and second opposite members disposed opposite to each other and the second ends of the first and second opposite members disposed opposite to each other;

wherein the first end of the connecting member is connected to the first end of the first opposite member and the second end of the connecting member is connected to the first end of the second opposite member forming the wicking structure in the shape of a substantially rectangular frame having first and second supports and a span, each of the supports and span having outer and inner surfaces with the inner surface closer to a center of the cavity of the container than the outer surface;

wherein the connecting member is disposed proximate the inner surface of the first wall, the first opposite member is disposed proximate the inner surface of the third wall, and the second opposite member is disposed proximate the inner surface of the fourth wall.

91. The fuel reservoir of claim 90, wherein the connecting member covers substantially the entire inner surface of the first wall, the first opposite member covers substantially the entire inner surface of the third wall, and the second opposite member covers substantially the entire inner surface of the fourth wall.

92. The fuel reservoir of claim 90, wherein each of the inner surfaces of the first, third and fourth walls comprises four edges and four corners, and wherein each of the outer surfaces of the first and second supports and the span of the wicking structure comprises four edges and four corners, with the four edges of the outer surface of the span disposed proximate the four edges of the inner surface of the first wall, the four corners of the outer surface of the span disposed proximate the four corners of the inner surface of the first wall, the four edges of the outer surface of the first support disposed proximate the four edges of the inner surface of the third wall, the four corners of the outer surface of the first support disposed proximate the four corners of the inner surface of the third wall, the four edges of the outer surface of the second support disposed proximate the four edges of the inner surface of the fourth wall, and the four corners of the outer surface of the second support disposed proximate the four corners of the inner surface of the fourth wall.

93. The fuel reservoir of claim 92, wherein the free rise wick height of the wicking structure is greater than the longest dimension.

94. The fuel reservoir of claim 92, wherein the wicking structure comprises a wicking material selected from the group consisting of foams, bundled fibers, matted fibers, woven fibers, nonwoven fibers and inorganic porous materials.

95. The fuel reservoir of claim 94, wherein the wicking structure comprises a wicking material selected from the group consisting of foams, bundled fibers, matted fibers, woven fibers and nonwoven fibers.

96. The fuel reservoir of claim 95, wherein the wicking material is selected from the group consisting of:

polyurethane foam;

melamine foam;

cellulose foam;

nonwoven felts of polyamide, polyethylene, polypropylene, polyester, polyacrylonitrile, or mixtures thereof; and bundled, matted or woven fibers of cellulose, polyethylene, polypropylene, polyester, polyacrylonitrile, or mixtures thereof.

97. The fuel reservoir of claim 96, wherein the polyurethane foam is a felted polyurethane foam, reticulated polyurethane foam or felted reticulated polyurethane foam, the polyamide is nylon and the polyester is polyethylene terephthalate.

98. The fuel reservoir of claim 97, wherein the wicking material is selected from the group consisting of a felted polyurethane foam, reticulated polyurethane foam and felted reticulated polyurethane foam.

99. The fuel reservoir of claim 92, wherein the wicking structure comprises a polyurethane foam with a density in the range of about 0.5 to about 45 pounds per cubic foot and pore sizes in the range of about 10 to about 200 pores per linear inch.

100. The fuel reservoir of claim 99, wherein the wicking structure comprises a polyurethane foam with a density in the range of 0.5 to 15 pounds per cubic foot and pore sizes in the range of 40 to 200 pores per linear inch.

101. The fuel reservoir of claim 92, wherein the wicking structure is a felted reticulated polyurethane foam with a density in the range of 2 to 45 pounds per cubic foot and a compression ratio in the range of 1.1 to 30.

102. The fuel reservoir of claim 92, wherein the wicking structure has a solid volume no more than about 50% of a volume of the cavity within the container.

103. The fuel reservoir of claim 102, wherein the wicking structure has a solid volume no more than about 25% of the volume of the cavity within the container.

104. The fuel reservoir of claim 103, wherein the wicking structure has a solid volume no more than about 10% of the volume of the cavity within the container.

105. The fuel reservoir of claim 92, wherein the wicking structure has a void volume at least about 50% of an external volume of the wicking structure.

106. The fuel reservoir of claim 105, wherein the wicking structure has a void volume at least about 65% to 98% of the external volume of the wicking structure.

107. The fuel reservoir of claim 106, wherein the wicking structure has a void volume at least about 70% to 85% of the external volume of the wicking structure.

108. The fuel reservoir of claim 77, wherein the first member covers substantially an entire inner surface of the first wall, the second member covers substantially an entire inner surface of the second wall, the third member covers substantially an entire inner surface of the third wall, and the fourth member covers substantially an entire inner surface of the fourth wall.

* * * * *